3,230,044
MONOCLINIC ZINC PHOSPHIDE PREPARATION
Imre J. Hegyi, Cranbury, N.J., assignor to Radio Corporation of America, a corporation of Delaware
No Drawing. Filed Aug. 10, 1962, Ser. No. 216,067
4 Claims. (Cl. 23—204)

This invention relates to a new crystal form of zinc phosphide $ZnP_2$ and to methods of preparation thereof.

Two previously known forms of zinc phosphide have been prepared by passing elemental phosphorus vapor in dry nitrogen or hydrogen over metallic zinc heated at about 780° C. in a porcelain tube at about atmospheric pressure. A black product collects at the cool end of the tube and gives an analysis of about 60% $Zn_3P_2$ and about 40% $ZnP_2$. This black product is then sublimed at about 1100° C. in a stream of hydrogen gas and then cooled to separate the product into two distinct crystal forms, one being red tetragonal $ZnP_2$ and the other being black tetragonal $Zn_3P_2$.

The invention described herein comprises black monoclinic zinc phosphide having the composition $ZnP_2$. The black monoclinic $ZnP_2$ of the invention may be prepared by reacting elemental zinc vapor with elemental phosphorus vapor. The reaction product is maintained at about 700 to 850° C. at pressures of at least three atmospheres, preferably in a closed system in about three to twenty atmospheres pressure, whereby crystals of black monoclinic $ZnP_2$ are deposited.

The synthesis of the black monoclinic zinc phosphide of the invention is preferably carried out in a sealed evacuated quartz ampoule in which three distinct temperature regions are defined. Zinc metal in a quartz boat is located at one extreme end region of the ampoule where the temperature is maintained at about 1000° to 1150° C. Elemental phosphorus is located at the other extreme end region of the ampoule where the temperature is maintained at about 460° to 550° C. The temperature applied to the phosphorus, through the partial pressure of phosphorus, determines the pressure within the ampoule and is adjusted to provide a pressure of at least three atmospheres. It is preferred that an excess of phosphorus over that required to react with all of the zinc metal be present. The intermediate region of the ampoule is maintained at about 700° to 850° C. The furnace surrounding the ampoule consists of loosely assembled insulating bricks holding electric resistance heating elements adjacent the ampoule. The intermediate region is defined by an insulating partition about two and one-half inches thick around the ampoule. The entire assembly is placed within a closed chemical hood as a safety precaution. During the heating, zinc vapor and phosphorus vapor are produced at the respective end regions. The vapors pass to the intermediate region where they react to form black monoclinic zinc phosphide $ZnP_2$, which deposits on the walls of the intermediate region of the ampoule.

In a typical synthesis, 3.1 grams of zinc metal (99.999% pure) and 4.6 grams of red phosphorus (semiconductor grade) are placed at opposite ends of a sealed evacuated quartz ampoule about one half inch in diameter and about seventeen inches long as described above. The zinc is heated at about 1000° C. and the phosphorus is heated at about 510° C. to maintain a pressure of 10 atmospheres within the ampoule. The regional temperatures are maintained for 18 to 24 hours until all of the zinc has reacted and deposited as zinc phosphide in the intermediate region. Then, the entire ampoule is kept at 280° C. for about 16 hours to convert the excess and unreacted phosphorus from the white form (which is produced during the heating) to the red form. Converting the phosphorus to the red form avoids the possibility of spontaneous ignition when, after the synthesis and heating is completed, the ampoule is broken and exposed to air.

The product is a batch of crystals of $ZnP_2$ in the intermediate region of the ampoule. The batch usually contains crystals of both red tetragonal $ZnP_2$ and black monoclinic $ZnP_2$. The black monoclinic crystals are of varying thickness. They appear black when thick, and dark greenish when crystallized in very thin plates about one micron and less in thickness. For phosphorus pressures of about three atmospheres approximately 50% of the crystals are red tetragonal $ZnP_2$, while the remainder are black monoclinic $ZnP_2$. For phosphorus pressures of about ten atmospheres, almost 100% of the crystals are black monoclinic $ZnP_2$. X-ray examination of the product indicated that none of the black crystals are black tetragonal $Zn_3P_2$.

The red tetragonal $ZnP_2$ crystals consists of rather flat thick plates, whose major surfaces are 001 planes. Out of these plates rise a forest of truncated pyramids each having a square cross section. The pyramids show an increase of steepness of their walls proceeding up from the pyramid base. X-ray examination shows the crystals to be tetragonal with unit cell dimensions of about $$a = 5.09 \pm .01 \text{ A.}$$

and $c=18.50\pm.05$ A. The spacing group is one of the two enantiomorphs $P4_12_12$ or $P4_32_12$.

The black monoclinic $ZnP_2$ crystals exhibit two distinct crystal habits. The first habit consists of extremely thin greenish plates. The length of a typical plate is along the crystallographic $b$ axis, and the thickness of a plate is about one micron. A second habit consists of black rods of polyhedric shape elongated along the crystallographic $c$ axis. It is often possible to observe epitaxial growth of black monoclinic $ZnP_2$ on red tetragonal $ZnP_2$ crystals. Sometimes several twins of the monoclinic form rotated within the crystallographic $bc$ plane are observed. Black monoclinic $ZnP_2$ crystals have unit cell dimensions of about $a=8.85\pm.02$ A., $b=7.29\pm.02$ A., $c=7.56\pm.02$ A. and $\beta=102.3°\pm0.20$. The space group is $P2_1/c$.

Optical absorption data provides a basis for energy bandgap determination in $ZnP_2$. The energy bandgap of red tetragonal $ZnP_2$ was determined to be about 2.05 e.v. (electron volts). Since the crystals were fairly thick, absorption coefficients were obtained only up to 250 cm.$^{-1}$. The optical data for black monoclinic $ZnP_2$ are obtained on thinner crystals and provide absorption coefficient values up to almost 100 times higher than for the red tetragonal form. A pronounced dichroism was observed for absorption coefficients above 5000 cm.$^{-1}$. The energy bandgap is about 1.33 e.v. for the electric vector of plane polarized light parallel to the crystallographic $c$ axis and 1.37 e.v. for the light polarized perpendicular to the crystallographic $c$ axis. For higher absorption coefficients, this dichroism becomes larger being about 0.28 e.v. at 30,000 cm.$^{-1}$.

The red tetragonal $ZnP_2$ crystals have resistivities of about $10^8$ ohm cm. The black monoclinic $ZnP_2$ crystals have resistivities of about 10 ohm cm. with an anisotropic factor of about two along the flat and perpendicular direction of the crystal. Black monoclinic $ZnP_2$ crystals showed a photoconductive response to unpolarized light as one broad smooth peak covering the region of energy 1.35 to 1.7 e.v. Upon polarization of the incident light, the broad peak was resolved. Parallel to the crystallographic $c$ axis the maximum photoconduction peak occurs at about 1.45 e.v. corresponding to the first absorption edge (1.33 e.v.). Perpendicular to the $c$ axis, the maximum peak occurs between about 1.65 and 1.85 e.v. which corresponds to the 1.37 e.v. absorption edge.

A crystal of black monoclinic zinc phosphide may be used as a photoconductive element in a photosensitive device which is sensitive in the infrared region of the spectrum. A simple device comprises a crystal of the material having a pair of electrodes attached thereto.

What is claimed is:

1. A method for preparing black monoclinic zinc phosphide comprising reacting elemental zinc vapor with elemental phosphorus vapor and then maintaining the reaction product at about 700 to 850° C. at pressures of at least three atmospheres, whereby said zinc phosphide crystallizes therefrom.

2. A method for preparing black monoclinic zinc phosphide comprising reacting elemental zinc vapor with elemental phosphorus vapor and then crystallizing said zinc phosphide from the reaction product thereof in a region maintained at about 700 to 850° C. at pressures of about three to twenty atmospheres, said method being conducted in a closed system.

3. A method for preparing black monoclinic zinc phosphide comprising placing a quantity of metallic zinc at one end of an ampoule, placing a quantity of elemental phosphorus at the other end of an ampoule, sealing said ampoule, heating said one end at about 1000 to 1150° C., heating said other end at about 460 to 550° C. and maintaining an intermediate region in said ampoule which is between said ends at temperatures between 700 and 850° C., whereby said zinc phosphide crystallizes in said intermediate region of said ampoule.

4. A method for preparing black monoclinic zinc phosphide comprising placing a quantity of metallic zinc at one end of an ampoule, placing a quantity of elemental phosphorus at the other end of an ampoule, sealing said ampoule, heating said one end at about 1000 to 1150° C., whereby zinc vapor is produced, heating said other end at about 460 to 550° C., whereby phosphorus vapor is produced and pressure of at least three atmospheres is produced throughout said ampoule, and maintaining an intermediate region in said ampoule which is between said ends at temperatures between 700 and 850° C., whereby said zinc vapor and said phosphorus vapor react and said black monoclinic zinc phosphide crystals deposit within said intermediate region.

References Cited by the Examiner

Mellor; "Comprehensive Treatise on Inorganic and Theoretical Chemistry," Longmans, Green and Co., New York 1928, vol. 8, page 483.

MAURICE A. BRINDISI, *Primary Examiner.*